United States Patent

Sato et al.

[11] Patent Number: 5,856,377
[45] Date of Patent: Jan. 5, 1999

[54] PROCESS FOR MANUFACTURING THERMOSETTING RESIN PARTICLES FOR POWDER COATING USE

[75] Inventors: Haruhiko Sato, Hirakata; Yutaka Harada, Suita, both of Japan

[73] Assignee: Nippon Paint Co., Ltd., Osaka, Japan

[21] Appl. No.: 814,773

[22] Filed: Mar. 10, 1997

[30] Foreign Application Priority Data

Oct. 29, 1996 [JP] Japan .................................. 8-304091

[51] Int. Cl.$^6$ ...................................................... C08K 9/00
[52] U.S. Cl. .......................... 523/201; 523/206; 523/207; 523/208; 523/221; 524/501
[58] Field of Search ................................ 523/201, 206, 523/207, 208, 221; 524/501

[56] References Cited

U.S. PATENT DOCUMENTS 5,034,432  7/1991  Ueno et al. ............................ 523/221
5,210,113  5/1993  Waters .................................. 523/205
5,610,269  3/1997  Sato et al. ............................. 528/499

*Primary Examiner*—Edward J. Cain
*Attorney, Agent, or Firm*—Millen, White, Zelano, & Branigan, P.C.

[57] ABSTRACT

A process for manufacturing thermosetting resin particles for powder coating use exhibiting improved anti-blocking property and workability is disclosed. The process include providing a suspension of the thermosetting resin particles in an aqueous medium and an emulsion or dispersion of a vinyl-based polymer having a relatively high Tg, respectively. The thermosetting resin particles are then treated with the emulsion while the resin particles are still suspended in or wetted with the aqueous medium to adhere the vinyl based polymer onto the resin particles forming a shell layer. The resin particles are dried and made to ready to use in the powder coating.

13 Claims, No Drawings

PROCESS FOR MANUFACTURING THERMOSETTING RESIN PARTICLES FOR POWDER COATING USE

BACKGROUND OF THE INVENTION

The present invention relates to a process for manufacturing thermosetting resin particles for powder coating use having improved performance.

Much interest has been focussed on the use of powder coating technology in finishing various substrates such as automobile bodies and parts, houshold electrical appliance, building materials and so on for eliminating the emission of VOC to the environment. Resin particles for powder coating use require to satisfy with several important requirements in performance. They should not aggregate into a hard cake by blocking or premature curing during storage. They must be free-flowing and hardly susceptible to the development of electrastatic charge when feeding to the applicator pneumatically. Also, they must exhibit a good thermal flowability to form a smooth film when applied onto a substrate and then baked. For some applications, the coating films thus formed require high scratch resistance, acid rain resistance and weatherability.

However, it is hardly possible to meet all or most of these requirements simultaneously because some of these requirements are contradictory to each other. It was proposed in the past to use particles having a relatively low resin molecular weight or low Tg, or finer particles having a weight average particle size less than 10 μm in order to obtain coating films of high quality appearance. However, the use of low molecular weight or low Tg resin particles tends to decrease anti-blocking property, while the use of finer particles decreases powder flowability and often causes clogging of applicators and associated pneumatic feeders.

JP-A-02178360 and U.S. Pat. No. 5,034,432 disclose powder coating particles having adhered onto their surfaces finer resin particles having a particle size substantially smaller than the particle size of the substrate resin particles in an amount sufficient for preventing the substrate particles from directly contacting with each other. By selecting an appropriate material having relatively high Tg or softening point for the finer particles, it is possible to improve the anti-blocking property to some extent. Because adhesion of finer particles to larger substrate particles are performed while both components are in dry state, for example, by dry blending, it is difficult to cover individual large particles uniformly with fine particles to prevent blocking of large particles in naked areas. The dry blend process itself sometimes can increase the incidence of collision and thus aggregation of larger particles themselves before they are well covered with finer particles. Conventional powder coating compositions are produced by blending a binder resin with a crosslinker and optional additives such as pigments, kneading the blend under heat to make a molten mass, cooling and pulverizing the mass, and classifying pulverized particles. The particles thus produced comprise a large proportion of irregular particles defining frangible corners. The dry blend process can further crash irregular particles with frangible corners to increase the proportion of particles of smaller sizes less than desirable which have an adverse effect on the powder flowability of the composition. Since the above fine resin particles are not easily rest on sharp corners or edges of large substrate particles, the method taught in the cited references is not fully effective in enhancing the anti-blocking property of the conventional powder coating compositions.

A need exists, therefore, for powder coating compositions having improved storage stability and workability yet capable of forming coating films having high quality appearance.

SUMMARY OF THE INVENTION

The present invention provides a method for manufacturing thermosetting resin particles for powder coating use having an anti-blocking shell layer. According to the invention, an aqueous emulsion or dispersion of a vinyl based polymer having an average particle size of at least one tenth of the average particle size of said thermosetting resin particles is used for forming said shell layer. According to the invention, said thermosetting resin particles are produced by allowing a liquid thermosetting resin composition to solidify while being suspended as oil droplets in an aqueous medium. According to the present invention, the emulsion or dispersion of said vinyl based polymer is mixed with the solidified particles while the particles are still suspended in or wetted with said aqueous medium to enclose or encapsule the core of said thermosetting resin particles with the shell of said vinyl base polymer. Finally, the resin particles are recovered and dried to make the particles for ready to use in the powder coating technology.

In a preferred embodiment of the present inveniton, the binder resin of said liquid thermosetting resin composition has a Tg of from 20° C. to 70° C., more preferably from 30° C. to 50° C., while said vinyl base polymer has a Tg higher than the Tg of said binder resin within a range between 40° C. and 150° C., more preferably between 50° C. and 120° C.

In a preferred embodiment, said thermosetting resin particle are generally spherical in shape and have a narrow particle size distribution in terms of the ratio of the weight average particle size to the number average particle size of less than 2.

Other features and advantages of the present invention will become apparent as the description proceeds.

DETAILED DESCRIPTION OF THE INVENTION

Core Particles

The resin component from which core particles are made according to this invention may be any resin which is thermerlly curable and also soluble or swellable in conventional organic solvents. Such resins are well-known in the art and their selection is to be made depending upon the intended use of resin particles and properties required therefor. Examples thereof includes polyesters, (meth)-acrylate ester copolymers, aromatic vinyl compound copolymers, epoxy resins, phenol resins, melamine-formaldehyde resins, urea-formaldehyde resins and other thermosetting resins. Resins which are not thermosetting themselves, such as polyester resins, (meth)acrylate ester copolymers or aromatic vinyl compound copolymers are combined with an external crosslinker.

For use in powder coating application, the resin component preferably consists of an epoxy, acrylic or polyester resin in combination with an appropriate crosslinker thereof. Examples of crosslinkers include, as is well-known in the art, polycarboxylic anhydrides, dicyandiamide or acrylic resins for epoxy resins; polycarboxylic acids, epoxy resins or melamine resins for acrylic resins; and polycarboxylic acids and anhydrides, epoxy compounds, melamine resins or blocked polyisocyanates for polyester resins.

Particles for powder coating use may optionally contain various pigments such as titanium dioxide, ferric oxide, yellow iron oxide, carbon black, phthalocyanine blue or quinacridon red; surface conditioners such as polysiloxane or acrylic resins; plasticizers; UV absorbers; antioxidants; pigment dispersants; catalysts such as amines, imidazoles or cation polymerization initiators; and other resins. The solid core resin particles suspended in an aqueous medium may be prepared from a liquid thermosetting resin composition using various methods. Typically, the binder resin and the crosslinker are dissolved in a low boiling point, water-immiscible organic solvent to make a resin solution. After the addition of optional pigments and other additives, the mixture is added to an aqueous medium with vigorous stirring to disperse the liquid resin composition as oil droplets suspended in the aqueous medium. In order to solidify the oil droplets, the organic solvent is removed therefrom by, for example, distillation in vacuo or azeotropic distillation with water. Alternatively, the liquid resin composition may comprise an appropriate acrylic monomer instead of the organic solvent and a radical polymerization initiator. The aqueous suspension of core resin particles may be prepared from this liquid resin composition using the conventional suspension polymerization technique well-known in the art. Whichever method is used, the resulting solid resin particles will have a generally round shape which is advantageous in the powder flowability.

Advantageously, the oil droplet suspension initially prepared is subjected to a treatment for growing up to larger secondary particles by agglomeration and fusion before allowing the oil droplets to solidify in the suspension. The treatment includes decreasing the stability of oil droplet suspension. As the suspension stability decreases, the total surface area of the dispersed phase will decrease whereupon the oil droplet particles will agglomerate into larger secondary particles to accomodate the decrease in the total surface area. Since finer particles have larger specific surface area than coarse particles, they will preferentially agglomerate into larger secondary particles and vice versa. As a consequence, the particle size distribution of the secondary oil drop particles becomes narrower than that of primary oil droplet particles.

At least two methods are available to decrease the suspension stability of the oil droplets to agglomerate into larger secondary droplets. One method is disclosed in commonly assigned U.S. patent application Ser. No. 08/574,130 filed Dec. 18, 1995, the entire disclosure of which is incorporated herein by reference.

The first method utilizes a surface chemical phenomenon in which a stable suspension of oil droplets in an aqueous solution of a water-soluble polymer having a cloud point becomes less stable when the suspension is heated to a temperature above the cloud point and the oil droplet particles therein grow up to larger secondary particles by agglomeration and fusion. In order to control the particle size or to prevent phase separation, the suspension medium used in this method also contains a water-soluble polymer not having such cloud point as a temperature-independent stabilizer.

Typical examples of water-soluble polymers having a cloud point within the range between 30° C. and 90° C. include polyvinyl alcohol based polymers having a hydrophobic group or block such as partly saponified polyvinyl alcohol (partly saponified polyvinyl acetate) having a degree or saponification of not greater than 85%, partly formalized polyvinyl alcohol or saponified ethylene-vinyl acetate copolymer (saponified EVA); cellulose derivatives such as methylcellulose or hydroxypropylcellulose; and non-ionic surfactants such as polyethylene glycol monoalkyl ethers or ethylene oxide-propylene oxide block copolymers. Water-soluble polymers not exhibiting cloud point themselves may be modified to have a cloud point within the above range by adding an amount of an electrolyte to their aqueous solutions. Two or more water-soluble polymers having a cloud point may be used in combination.

Typical examples of water-soluble polymers not having such cloud point include fully saponified polyvinyl alcohol, partly saponified polyvinyl alcohol having a degree of saponification of greater than 85%, ethylcellulose, hydroxyethylcellulose, polyethylene glycol and the like.

The weight ratio of the water-soluble polymer not having cloud point to the water-soluble polymer having cloud point may vary within a wide range depending upon the nature thereof and is generally from 99:1 to 10:90 to control the size of secondary particles in a suitable range.

The liquid thermosetting resin composition containing an organic solvent is dispersed in an aqueous solution containing a water-soluble polymer having cloud point and a water-soluble polymer not having cloud point at a temperature below said cloud point so that the mixture forms a suspension in which the liquid resin composition is suspended as primary particles of oil droplets having a number average particles size of less than 10 $\mu$m. The proportions of the water-soluble polymer having cloud point and the water-soluble polymer not having cloud point may be varied, as stated before, depending upon the nature of particular liquid resin composition and the desired particle size. In order to facilitate mixing, the total concentration of the water-soluble polymers in the aqueous solution is preferably from 0.02 to 20% by weight, and the ratio of the liquid resin composition to the aqueous solution is preferably from 1:0.5 to 1:3. Mixing of these two components may be accomplished by means of a homogenizer when their viscosities are relatively low. When their viscosities are relatively high, mixing may be accomplished by means of a universal mixer or a planetary mixer. In cases where the liquid resin composition and the aqueous solution do not initially form a suspension, the liquid resin composition is dispersed first in an aqueous solution solely containing the water-soluble polymer not having cloud point optionally in combination with a conventional surfactant to make a suspension. Thereafter the water-soluble polymer having cloud point may be added to the suspension. The suspension is adjusted to a final resin composition concentration of from 10 to 50% by weight by diluting, where necessary, with deionized water.

The suspension thus produced is heated to a temperature higher than the cloud point. This temperature depends on the cloud point of a particular water-soluble polymer and the nature of a particular liquid resin composition. A portion of the organic solvent contained in the liquid resin composition will be distilled off during the course of this heating or by subsequently heating the suspension to a temperature higher than the cloud point. Oil droplets initially formed as primary particles will normally agglomerate into secondary particles of large size as the temperature increases above the cloud point. In order to accomplish a desired particle size in the final particles, the growth of oil droplets may be terminated by distilling off remaining portions of the organic solvent to increase the viscoelasticity of the particles or cooling the suspension to a temperature below the cloud point. As stated before, this may also be done by selecting appropriate ratio of the water-soluble polymer not having cloud point to the water-soluble polymer having a cloud point.

The temperature at which the solvent is distilled off may be easily controlled by applying vacuum or reduced pressure.

The second method is disclosed in commonly assigned U.S. patent application Ser. No. 08/725,672 filed Oct. 2, 1996, the entire disclosure of which is incorporated herein by reference.

It is well-known that anionic or cationic polyelectrolytes are hardly soluble in water when occurring as non-ionized molecules but become soluble as the degree of electrolytic dissociation increases by neutralization. Therefore, a stable suspension of oil droplets in an aqueous solution of a neutralized polyelectrolyte becomes less stable when the pH of the suspension is adjusted to a certain range within which the polyelectrolyte becomes insoluble with the decrease in the degree of electrolytic dissociation, and the oil droplets in the suspension grow up to larger secondary particles by agglomeration and fusion. The second method utilizes this physico-chemical phenomenon to prepare resin particles for use as powder coating compositions.

A variety of anionic or cationic polyelectrolytes may be used. Examples thereof includes sulfonated polyvinyl alcohol, carboxylated polyvinyl alcohol, polyacrylic acid, polymethacrylic acid, sodium polyacrylate, sodium polymethacrylate, polystyrenesulfonic acid, sodium polystyrenesulfonate, maleic acid copolymers, polyvinylphosphoric acid, carboxymethylcellulose, alginic acid, sodium alginate and other polymers having carboxylic, sulfonic or phosphoric acid group. Cationic polyelectrolytes having a quaternary ammonium base group may also be used. Mixtures of two or more polyelectrolytes having the same polarity may be used. These polyelectrolytes may be used in combination with a non-electrolytic suspension-stabilizer well-known in the art such as starch, ethylcellulose, hydroxyethylcellulose, gelatin, polyvinyl alcohol or polyvinylpyrrolidone.

According to this method, the water-soluble polymer electrolyte, namely polyelectrolyte is dissolved in water optionally in combination with a conventional suspension stabilizer at a pH at which the polyelectrolyte is soluble. When necessary, an acid or base is used to neutralize the polyelectrolyte. The neutralizing acid or base used for this purpose should not have an adverse effect on the resin component and includes hydrochloric or acetic acid for cationic polyelectrolytes and sodium hydroxide or aqueous ammonia for anionic polyelectrolytes. The total concentration of the polyelectrolyte plus conventional stabilizer in the suspension medium may vary with the nature of particular polyelectrolyte or stabilizer and generally ranges from 0.02 to 20% by weight.

The liquid resinous composition is then suspended as oil droplets in the aqueous solution containing the polyelectrolyte. Mixing of these two components may be accomplished by means of a homogenizer when their viscosities are relatively low. When their viscosities are relatively high, mixing may be accomplished by means of a universal mixer or a planetary mixer. The initial particle size of oil droplets present in the suspension may vary depending upon the intended application and is preferably less than 10 microns. The suspension is adjusted to a final resinous composition concentration of from 10 to 50% by weight by diluting, where necessary, with deionized water.

In the next step, the pH of the suspension is adjusted to a value at which the polyelectrolyte is insolubilized. The pH adjustment may be accomplished using an acid for anionic polyelectrolytes or a base for cationic polyelectrolytes. Not all molecules of the polyelectrolyte need be insolubilized but a portion thereof may remain ionically dissociated. When the polyelectrolyte present in the suspension is insolubilized at least partly, the suspension becomes less stable. As a consequence the total surface area of dispersed phase decreases and finer particles tend to agglomerate with each other into larger secondary particles having a number average particle size of 2 to 20 times greater than that of primary particles to accomodate the decrease in the total surface area of dispersed phase.

During or after the agglomeration of primary particles into larger secondary particles, the liquid resinous composition present in the suspension as oil droplet is allowed to solidfy. This may be accomplished by either heating the suspension for a sufficient time to complete the polymerization of monomers contained in the resinous composition or removing the organic solvent contained in the liquid resinous composition by means of distillation under reduced pressure or azeotropic distillation with water.

The weight average particle size of core particles depends on particular applications. For finishing household electrical appliance or building materials, a weight average particle size from 30 to 50 $\mu$m is chosen. For use as top coat compositions in finishing, for example, automobile bodies, a weight average particle size of less than 30 $\mu$m is required to produce a thin film having high quality appearance. As stated before, finer particle size requiremnt are contradictory to free-flowing and workability requirements. Since core particles produced by the above methods are generally spherical in shape and have a narrow particle size distribution, they are free-flowing even the weight average particle size lies between 3 $\mu$m and 20 $\mu$m.

Vinyl Based Polymer Emulsion or Dispersion

Because powder coating particles must melt and form a molten film on a substrate when heating to a baking temperature of lower than 200° C., the Tg or softening point of the binder resin should not be too high and generally lies between 20° C. and 70° C., more preferably between 30° C. and 50° C.

In order to prevent the particles containing such a binder resin from blocking or caking, the particles are surface treated with an aqueous emulsion or dispersion of a vinly based polymer having a Tg higher than the Tg of the binder resin, while the particles are suspended in or wetted with the suspension medium. The vinly based polymer generally have a Tg from 40° C. to 150° C., preferably from 50° C. to 120° C. The average particle size of the vinly base polymer in the emulsion or dispersion as primary particles should be at least one tenth of the average particle size of the particles to be treated. This treatment produces a core-shell structure in which the particles containing a low Tg resin are core portion and the high Tg vinyl based polymer is shell portion.

The emulsion or dispersion of vinyl based polymer may be prepared by polymerizing a mixture of ethylenically unsaturated monomers using the emulsion or suspension polymerization method, or the nonaqueous dispersion polymerization method followed by solvent substitution. The emulsion polymerization method is conveniently used to produce particles of 0.01–0.5 $\mu$m in diameter.

Examples of usable monomers include styrenic monomers such as styrene, vinyl toluene, ethylstyrene or p-chlorostyrene, acrylic monomers such as methyl (meth)acryalte, ethyl (meth)acrylate, n-butyl (meth)acrylate or 2-ethylhexyl (meth)acrylate, and mixtures thereof. Optionally, the monomer mixture may contain a small proportion of a basic monomer such as N,N-dimethylaminoethyl methacrylate, N,N-diethylaminoethyl methacrylate or vinylpyridine, an acid monomer such as acrylic, methacyrlic, maleic or fumaric acid or maleic anhydride, or a polyfunctional monomer such as divinylbenzene, ethylene glycol dimethacrylate, trimethylpropane triacrylate, glycidyl methacrylate or glycidyl acrylate.

The emulsion polymerization may be carried out in an aqueous medium containing a surfactant. Anionic surfactants such as sodium alkylbenzenesulfonate, sodium alkyl sulfate, sodium alkylsulfosuccinate, sodium stearate or sodium oleate, cationic surfactants such as alkylpyrinium chloride or tetraalkylammonium chloride, or nonionic surfactants such as polyethylene glycol alkylphenyl ether or ethoxylated sorbitan fatty acid ester may be used alone or in combination. The polymerization may also be carried out in the absence of surfactant using so-called the soap-free emulsion polymerization method.

One of the features of the present invention resides in the fact that the vinyl based polymer particles are deposited or adhered onto the surfaces of core particles while both vinyl based polymer particles and core particles are wet. This insures firm adhesion and uniform distribution of the shell polymer onto the core particles with a minimum quantity of the shell polymer within a range between 0.05 and 20%, preferably between 0.1 and 10% by weight as solids of the core particles.

The simplest way to achieve this wet adhesion is to mix the emulsion or dispersion of shell polymer with the core particles wetted with their suspension medium during the drying step of the wet core particles. To this end, the core particles are separated from the suspension by centrifugation or filtering. When the wet core particles are dried in a fluidized bed dryer, the emulsion or dispersion of the shell polymer is injected into the dryer. When a rotary disc dryer or vacuum rotary dryer is used, the emulsion or dispersion of the shell polymer is mixed with the core particles in the dryer. Other methods such as spray drying of a mixture of the core particles and the emulsion or dispersion could be used.

The shell polymer may be deposited onto the surfaces of the core particles while the core particles are still suspended in an aqueous medium. When the aqueous medium used for the production of emulsions or dispersions of the shell polymer contains a surfactant or dispersant that insolubilizes by the adjustment its pH within a certain range, the emulsion or dispersion is added to the suspension of core particles and then the pH of the mixture is adjusted within such range. The shell polymer will deposit onto the surfaces of the core particles in the suspension medium. The same applies when the emulsion is produced by the soap-free emulsion polymerization method using a polymerization initiator that insolibilized within a certain pH range.

When the core particles have a plurality of ionized groups on the surfaces, the shell polymer can be deposited on the core particles by adding the emulsion or dispersion of polymers having ionized groups of the opposite polarity to the suspension of core particles.

The core particles thus treated are separated from the suspension medium by centrifugation or filtering and then dried using conventional methods and apparatus such as hot air dryers, vacuum dryers or freeze dryers depending upon the Tg or softening point of the binder resin of core particles.

Powder Coating Composition

The resulting resin particles exhibit improved anti-blocking and free-flowing characteristics compared with the corresponding resin particles free of the shell polymer layers.

Since the resin particles produced by the present invention not only have a predetermined particle size but also consist mainly of spherical particles with lesser proportions of microfine and irregular shape particles than particles produced by the prior art methods, they are free-flowing and produce a thin coating film having high quality appearance properties. In addition, a high deposit efficiency is achieved using the resin particles produced by the present invention in the powder coating technology. This is because the resin particles are virtually free from microfine particles which are easily blown off in the air upon application and the recovered resin particles still retain virtually the same particle size distribution before use.

The resin particles may be applied onto a substrate using the electrostatic coating method such as corona or friction charging. Conventional powder coating compositions usually contain an amount of fine silica powder effective to improve the free-flowing property of the composition. The addition of silica powder to the composition for use as a transparent top coat composition in the automobile body finish often impairs the quality of appearance because of the difference in refractive index from the body of top coat. The resin particles produced by the process of the invention may be used in the powder coating technology without the addition of silica powder. The conventional powder coating compositions also contain aluminum oxide powder when positive charging is desired. The use of aluminum oxide powder may be dispensed with by the present invention when a cationic polymer is used for surface treating the core resin particles.

EXAMPLES

The following examples are given for illustrative purpose only but are not limiting. All parts and percent therin are by weight unless otherwise specified.

Production Example 1

Resin solution A

A reactor equipped with a stirrer, condenser, thermometer and nitrogen gas tube was charged with 63 parts of xylene and heated to 130° C. To this was added the following monomer mixture over 3 hours under nitrogen gas atmosphere.

| Material | Parts |
| --- | --- |
| Glycidyl methacrylate | 40 |
| Styrene | 25 |
| Methyl methacrylate | 25 |
| Isobutyl methacrylate | 10 |
| t-Butyl peroctoate | 3 |

Thereafter the mixture was maintained at the same temperature for 30 minutes. After adding 1 part of t-butyl peroctoate over 30 minutes, the mixture was maintained at the same temperature for 1 hour and then cooled to room temperature.

A sample was taken from the resin solution, and dried in a hot air-circulating oven to remove the solvent. The glass transition temperature (Tg) of the resin as determined by the differential scanning calorimetry (DSC) was 55° C.

Production Example 2

Resin solution B

A reactor equipped with a stirrer, condenser, thermometer and nitrogen gas tube was charged with 63 parts of xylene and heated to 130° C. To this was added the following monomer mixture over 3 hours under nitrogen gas atmosphere.

| Material | Parts |
| --- | --- |
| Glycidyl methacrylate | 40 |
| Styrene | 20 |
| Methyl methacrylate | 17 |
| Isobutyl methacrylate | 18 |
| t-Butyl peroctoate | 7 |

Thereafter the mixture was maintained at the same temperature for 30 minutes. After adding 1 part of t-butyl peroctoate over 30 minutes, the mixture was maintained at the same temperature for 1 hour and then cooled to room temperature.

The Tg of the resin as determined as in Production Example 1 was 30° C.

Production Example 3

Resin solution C

A reactor equipped with a stirrer, condenser, thermometer and nitrogen gas tube was charged with 63 parts of xylene and heated to 130° C. To this was added the following monomer mixture over 3 hours under nitrogen gas atmosphere.

| Material | Parts |
| --- | --- |
| Glycidyl methacrylate | 40 |
| Styrene | 20 |
| Methyl methacrylate | 20 |
| Dimethylaminoethyl methacrylate | 10 |
| n-Butyl methacrylate | 5 |
| t-Butyl peroctoate | 3 |

Thereafter the mixture was maintained at the same temperature for 30 minutes. After adding 1 part of t-butyl peroctoate over 30 minutes, the mixture was maintained at the same temperature for 1 hour and then cooled to room temperature.

The Tg of the resin as determined as in Production Example 1 was 40° C.

Production Example 4

Polymer emulsion A

A reactor equipped with a stirrer, nitrogen gas tube, thermometer and reflux condenser was charged with 300 parts of deionized water containing 0.2 parts of sodium dodecylbenzenesulfonate, and heated to 80° C. To this were added 0.1 parts of potassium persulfate and then a mixture of 85 parts of methyl methacrylate and 15 parts of n-butyl acrylate over 2 hours in the nitrogen gas atmosphere with stirring. Thereafter the mixture was maintained at the same temperature for one hour. The average dimeter of the emulsion particles was 0.12 $\mu$m.

A sample of the emulsion was taken and evaporated to dryness. The Tg of the polymer as determined in Production Example 1 was 68° C.

Production Example 5

Polymer emulsion B

A reactor as used in Production Example 4 was charged with 300 parts of deionized water containing 0.1 parts of sodium oleate and heated to 80° C. To this were added 10 parts of a neutrized solution (with NaOH) containing 0.1 parts of azobis-cyanovaleric acid in deionized water, and then a mixture of 90 parts of methyl methacrylate and 10 parts of n-butyl acrylate over 2 hours in the nitrogen gas atmosphere with stirring. Thereafter the mixture was maintained at the same temperature for one hour. The average diameter of the emulsion particles was 0.08 $\mu$m. When an aliquot of the emulsion having a pH of 9 was adjusted at pH 5 with 0.1N HCl, the viscosity of the emulsion increased and the polymer particles were sedimented upon centrifugation. The Tg of the polymer as determined in Production Example 4 was 80° C.

EXAMPLE 1

A thermosetting resin composition was produced by mixing the following materials in a sand grind mill.

| Material | Parts |
| --- | --- |
| Resin solution A | 80.30 |
| Curing agent (1,10-decanedicarboxylic acid sold by Ube Industries, Ltd.) | 12.00 |
| Polysiloxane surface conditioner (YF-3919 sold by Toshiba Silicone Co., LTd) | 0.10 |
| Benzoin | 0.29 |
| UV absorber | 1.20 |

Separately, an aqueous solution was prepared by dissolving 6 parts of GOHSENOL GH-20 (polyvinyl alcohol having a degree of saponification of 88% sold by The Nippon Synthetic Chemical Industry Co., Ltd.) and 4 parts of GOHSENOL KL-05 ( polyvinyl alcohol having a degree of saponification of 80% sold by The Nippon Synthetic Chemical Industry Co., Ltd.) in 90 parts of deionized water.

The above resin composition and the aqueous solution were mixed in a homogenizer at $10^4$ r.p.m. to make a suspension. The particle sizes of suspended droplets were determined using a Coulter counter. The weight average particle size was 5.2 $\mu$m and the number average particle size was 2.4 $\mu$m.

The suspension was then diluted with 300 parts of deionized water and placed in a container equipped with a stirrer, temperature control means, reflux condenser and pressure reducing means. Then the suspension was heated to 70° C. under a reduced pressure of 160 Torr until the solvent in the dispersed phase was completely removed and cooled to room temperature. The resin particles in the suspension were tested for their particle size using a Coulter counter. The weight average particle size was 8.6 $\mu$m and the number average particle size was 6.2 $\mu$m. Thus, the particle size distribution curve was very sharp.

Then the resin particles were recovered from the suspension by filtering through a membrane filter (ULTRA FILTER PO sold by Miura Kagaku Sochi K. K.), and washed with water repeatedly. A wet cake of the resin particles having a moisture content of 35% was obtained.

154 parts of the wet cake (100 parts as solids) were placed in a fluidized bed dryer (SPIRAFLOW-SFC-15 sold by Freund Sangyo K. K.) and fluidized with an air stream heated to 50° C. A total of 10 parts of Emulsion A (2% as solids of resin particles) were intermittently applied onto the fluidized resin particles through a spray nozzle before drying the resin particles completely. Then the particles were removed from the dryer and agitated in a Henschel mixer to separate into individual particles retaining substantially the same particle size distribution prior to the treatment with the polymer emulsion. The angle of repose of the particles measured with a powder tester was 35°. The particles were free-flowing in the absence of silica powder.

EXAMPLE 2

Example 1 was followed except the Resin solution A was replaced with Resin solution B, and that the aqueous water-soluble polymer solution was replaced with a solution of 10 parts of GOHSENOL GH-20 and 2 parts of METOLOSE 65SH (hydroxypropylmethylcellulose sold by Shin-Etsu Chemical Co., Ltd.) in 82 parts of deionized water. The weight average particle size and the number average particle size of oil droplets in the resulting suspension were 5.1 µm and 2.3 µm, respsectively.

The suspension was then diluted with 300 parts of deionized water and placed in a container equipped with a stirrer, temperature control means, reflux condenser and pressure reducing means. After removing about 90% of the solvent contained in the dispersed phase by applying a reduced pressure of 20 Torr, the remaining solvent was completely removed by heating the suspension to 70° C. at a reduced pressure of 160 Torr. After cooling, the suspension was centrifuged and washed with water repeatedly to obtain a wet cake having a moisture content of 20%. The resin particles were found to possess a weight average particle size of 8.0 µm and a number average particle sise of 6.8 µm, exhibiting a sharp particle size distribution curve.

125 parts of the wet cake (100 parts as solid) and 25 parts of Emulsion A (5% as solids of resin particles) were placed in a single paddle mixing dryer (Nara Machinery K. K.). The mixture was then dried at 50° C. at 15 Torr with stirring to remove water completely. Then the particles were agitated in a Henschel mixer as before to separate into individual particles retaining substantially the same particle size distribution prior to the treatment with the polymer emulsion. The angle of repose was 38°. The particles were free-flowing in the absence of silica powder.

COMPARATIVE EXAMPLE 1

Example 2 was followed except that the treatment of the resin particles with Polymer emulsion A was dispensed with. Resin particles dried at 50° C. contained a large number of coarse and non-spherical particles. Therefore, the drying temperature was lowered to 30° C. to obtain separated individual resin particles.

Separately, Polymer emulsion A was spray dried to obtain a dry polymer powder.

100 parts of the dry resin particles and 7 parts of the dry polymer powder were blended in a Henschel mixer for 10 minutes at a rotor peripheral speed of 20 m/sec. The angle of repose of the treated particles was 45°.

EXAMPLE 3

The thermosetting resin particle suspension produced in Example 2 was diluted with deionized water to a solids concentration of 20%. To the suspension was added 5% as solids of the resin particles of Polymer emulsion B with stirring. Then the suspension was adjusted at a pH 5 with 0.1N HC1, and centrifuged to recover the resin particles as a wet cake containing 23% of water. The wet cake was dried and shaked as in Example 2 to separate into individual particles retaining the same particle size distribution prior to the treatment with the polymer emulsion. The angle of repose of the particles was 37°. The particles were free-flowing in the absence of silica powder.

EXAMPLE 4

A thermosetting resin composition was produced by mixing the following materials in a sand grind mill.

| Material | Parts |
| --- | --- |
| Resin solution C | 80.30 |
| Curing agent (1,10-decanedicarboxylic acid sold by Ube Industries, Ltd.) | 12.00 |
| Polysiloxane surface conditioner (YF-3919 sold by Toshiba Silicone Co., LTd) | 0.10 |
| Benzoin | 0.29 |
| UV absorber | 1.20 |

Separately, an aqueous solution was prepared by dissolving 10 parts of GOHSENOL GH-20 (polyvinyl alcohol having a degree of saponification of 88% sold by The Nippon Synthetic Chemical Industry Co., Ltd.) and one part of HPC-M (hydroxypropylcellulose sold by Nippon Soda Co., Ltd.) in 82 parts of deionized water.

The above resin composition and the aqueous solution were mixed as in Example 1 to make a suspension of droplets having a weight average particle size of 4.7 µm and a number average particle size of 2.5 µm.

The suspension was then diluted with 300 parts of deionized water and placed in a container equipped with a stirrer, temperature control means, reflux condenser and pressure reducing means. Then the suspension was evaporated under a reduced pressure of 20 Torr until about 90% of the solvent in the dispersed phase was removed. Then the suspension was evaporated at 55° C. at 110 Torr to remove the remaing solvent completely, and cooled to room temperature. The resin particles were found to possess a weight average particle size of 11.3 µm and a number average particle size of 7.4 µm, exhibiting a sharp particle size distribution curve. The suspension was centrifuged and washed with water repeatedly to remove water soluble polymers, and resuspended in deionized water at a solids concentration of 20%. To this was added 5% as solids of the resin particles of Polymer emulsion A with stirring. Electron microscopy demonstrated uniform adhesion of the polymer emulsion particles to each individual resin particles forming a shell layer.

The resin particles thus treated were recovered from the suspension by filtering, dried with circulating air stream in an oven at 45° C., and shaked in a Henschel mixer to separate into individual particles. The angle of repose was 38°. The particles were free-flowing in the absence of silica powder.

EXAMPLE 5

Example 1 was followed to prepare a thermosetting resin composition containing Resin solution A.

Separately, a water-soluble polymer solution was produced by dissolving 8.0 parts of GOHSENOL KL-05 (polyvinyl alcohol having a degree of saponification of 80% sold by The Nippon Synthetic Chemical Industry Co., Ltd.) and 0.1 parts of sodium polyacrylate in 92 parts of deionized water. The solution was adjust at pH 9 with 0.1N NaOH.

100 parts of the above resin composition were mixed with the above water-soluble polymer solution in a homogenizer at $10^4$ r.p.m. to obtain a suspension of oil droplets having a weight average particle size of 4.6 µm and a number average particle size of 2.5 µm.

The suspension having a pH of 9 was then diluted with 300 parts of deionized water and then placed in the same container as used in the preceding Examples. After distilling off about 80% of the solvent from the dispersed phase at 40° C. under a reduced pressure of 20 Torr and adjusting the pH at 4 with 0.1N HCl, the remaining solvent was completely removed by distilling the suspension at 60° C. under a reduced pressure of 160 Torr. The particles in the suspension were found to possess a weight average particle size of 9.2 μm and a number average particle size of 6.8 μm, exhibiting a sharp particle size distribution curve.

Then the resin particles were recovered from the suspension by filtering through a membrane filter (ULTRA FILTER PO sold by Miura Kagaku Sochi K. K.), and washed with water repeatedly. A wet cake of the resin particles having a moisture content of 35% was obtained.

154 parts of the wet cake (100 parts as solids) were placed in a fluidized bed dryer (SPIRAFLOW-SFC-15 sold by Freund Sangyo K. K.) and fluidized with an air stream heated to 50° C. A total of 40 parts of Polymer emulsion A (8% as solids of resin particles) were intermitently applied onto the fluidized resin particles through a spray nozzle before drying the resin particles completely. Then the particles were removed from the dryer and agitated in a Henschel mixer to separate into individual particles retaining substantially the same particle size distribution prior to the treatment with the polymer emulsion. The angle of repose of the particles measured with a powder tester was 35°. The particles were free-flowing in the absence of silica powder.

Performance Evaluation

The powder coating compositions produced in Examples 1–5 and Comparative Example 1 were tested for their performance. Each composition was applied electrostatically on a steel plate and baked at 140° C. for 30 minutes to produce a cured film of 50 μm film thickness. The appearance was evaluated in terms of NSIC (%) measured by a reflected image distinctiveness meter (Suga Testing Instrument Co., Ltd.).

Applicator systems used in the powder coating technology normally comprise a powder feeder (fluidized bed), injector, conveying hose and spray gun. Workability of powders of Examples and Comparative Example was evaluated by operating the above applicator for 1 hour continuously with each powder, and judged based on the volume of powder accumlated in the injector and the hose according to the following schedule.

Very good: Not accumulated at all.

Good: Not substantially accumulated.

Bad: Injector or hose was clogged.

Resistance to thermal blocking was evaluated as follows. A 20 g sample is placed stationarily in an oven for 10 days at various temperatures. Then the sample is sieved through a 80 mesh screen on a powder tester with vibration for 10 seconds. The maxium temperature at which not more than 2% of the sample is retained on the screen due to thermal blocking is determined.

The test results are shown in Table 1.

TABLE 1

| Item | EXAMPLE | | | | | COMP. EX. |
| --- | --- | --- | --- | --- | --- | --- |
|  | 1 | 2 | 3 | 4 | 5 | 1 |
| Tg, binder resin, °C. | 55 | 30 | 30 | 40 | 55 | 30 |
| Tg, emulsion polymer, °C. | 68 | 68 | 80 | 68 | 68 | 68 |
| % adhesion of polymer to resin particles, solids | 2 | 5 | 5 | 5 | 8 | 7 |
| Angle of repose, degree | 36 | 38 | 37 | 38 | 35 | 45 |

TABLE 1-continued

| Item | EXAMPLE | | | | | COMP. EX. |
| --- | --- | --- | --- | --- | --- | --- |
|  | 1 | 2 | 3 | 4 | 5 | 1 |
| Firm appearance, NSIC in % | 80 | 85 | 80 | 80 | 75 | 75 |
| Workability | Very good | Good | Very good | Very good | Very good | Bad |
| Resistance to thermal blocking, maximum temp. in °C. | 45 | 40 | 45 | 40 | 50 | 30 |

We claim:

1. A process for manufacturing thermosetting resin particles for powder coating use comprising
   (a) producing an aqueous suspension of said thermosetting resin particles by suspending a liquid thermosetting resin composition in an aqueous medium as oil droplet and then allowing the oil droplets to solidify while being suspended in the aqueous medium;
   (b) providing an aqueous emulsion or dispersion of a vinyl based polymer having an average particle size of not greater than one tenth of the average particle size of said thermosetting resin particles;
   (c) treating said thermosetting resin particles with said emulsion or dispersion of said vinyl based polymer while said thermosetting resin particles are suspended in or wetted with said aqueous medium to adhere said vinyl based polymer onto the surfaces of said thermosetting particles; and
   (d) drying said thermosetting particles thus treated.

2. The process according to claim 1, wherein said thermosetting resin particles comprise a binder resin having a Tg from 20° C. to 70° C., and wherein said vinyl base polymer has a Tg higher than the Tg of said binder resin, the Tg of said vinyl based polymer not exceeding 150° C.

3. The process according to claim 2, wherein the Tg of said binder resin ranges between 30° C. to 50° C., while the Tg of said vinyl base polymer ranges between 50° C. to 120° C.

4. The process according to claim 1, wherein said thermosetting resin particles are generally spherical in shape, and has a particle size distribution in terms of the ratio of the weight average particle size to the number average particle size of less than 2.

5. The process according to claim 4, wherein the weight average particle size of said thermosetting resin particles is less than 30 μm.

6. The process according to claim 5, wherein said weight average particle size thermosetting resin particles is less than 20 μm.

7. The process according to claim 1, wherein the emulsion or dispersion of said vinyl based polymer is produced by emulsion polymerization of a mixture of ethylenically unsaturated monomers in an aqueous medium.

8. The process according to claim 1, wherein said step (c) comprises applying said emulsion or dispersion onto said thermosetting resin particles while being wetted with said aqueous medium prior to complete drying.

9. The process according to claim 1, wherein said step (c) comprises adding said emulsion or dispersion to said suspension of said thermosetting resin particles, and adjusting said suspension at a pH at which said emulsion or dispersion undergoes phase separation.

10. The process according to claim 1, wherein said thermosetting resin particles are ionically charged to a first polarity in the suspension while said vinyl based polymer is ionically charged in the emulsion or dispersion to a second polarity which is opposite to the first polarity, and wherein said step (c) comprises mixing said emulsion or dispersion with said suspension.

11. The process according to claim 2, wherein said step (d) is carried out at a temperature below the Tg of said binder resin.

12. The process according to claim 1, the ratio of said vinyl base polymer to said thermosetting resin particles is from 0.05 to 20% by weight as solids.

13. The process according to claim 12, wherein said ratio is from 0.1 to 10% by weight as solids.

\* \* \* \* \*